(12) United States Patent
Lanctot-Downs et al.

(10) Patent No.: US 9,243,182 B2
(45) Date of Patent: Jan. 26, 2016

(54) HYDRAULIC FRACTURING WITH IMPROVED VISCOSITY LIQUEFIED INDUSTRIAL GAS BASED SOLUTION

(75) Inventors: Camille Lanctot-Downs, Edmonton (CA); Michel Epiney, Duvernay (CA); Fabrice Laberge, Outremont (CA); Vasuhi Rasanayagam, Newark, DE (US); Meenakshi Sundaram, Newark, DE (US)

(73) Assignees: American Air Liquide Inc., Fremont, CA (US); Air Liquide Canada, Inc., Montreal, Quebec (CA)

( * ) Notice: Subject to any disclaimer, the term of this patent is extended or adjusted under 35 U.S.C. 154(b) by 504 days.

(21) Appl. No.: 13/590,464

(22) Filed: Aug. 21, 2012

(65) Prior Publication Data

US 2014/0057813 A1 Feb. 27, 2014

(51) Int. Cl.
*C09K 8/62* (2006.01)
*C09K 8/68* (2006.01)

(52) U.S. Cl.
CPC ........................................ *C09K 8/68* (2013.01)

(58) Field of Classification Search
None
See application file for complete search history.

(56) References Cited

U.S. PATENT DOCUMENTS

| | | |
|---|---|---|
| 3,108,636 A | 10/1963 | Peterson |
| 3,664,422 A | 5/1972 | Bullen |
| 3,822,747 A | 7/1974 | Maguire |
| 4,374,545 A | 2/1983 | Bullen et al. |
| 4,580,629 A | 4/1986 | Jaworski |
| 5,069,283 A | 12/1991 | Mack |
| 5,558,160 A | 9/1996 | Tudor |
| 5,566,760 A | 10/1996 | Harris |
| 7,897,547 B1 | 3/2011 | Lin et al. |
| 2004/0072700 A1 | 4/2004 | Gupta et al. |
| 2005/0028979 A1 | 2/2005 | Brannon et al. |
| 2006/0009363 A1 | 1/2006 | Crews |
| 2010/0018710 A1* | 1/2010 | Leshchyshyn et al. .... 166/280.2 |
| 2010/0181065 A1* | 7/2010 | Ladva et al. ............. 166/250.01 |
| 2013/0306321 A1* | 11/2013 | Lanctot-Downs et al. 166/308.1 |

FOREIGN PATENT DOCUMENTS

CA 2165150 A1 6/1996

OTHER PUBLICATIONS

Robert M. Enick, David K. Olsen, National Energy Technology Laboratory, "Mobility and Conformance Control for Carbon Dioxide Enhanced Oil Recovery (CO2-EOR) via Thickeners, Foams, and Gels—A Detailed Literature Review of 40 Years of Research," DOE/NETL-2012/1540 (267 pages).
PCT/US2013/055918, International Search Report and Written Opinion, Jan. 3, 2014.
International Search Report and Written Opinion for related PCT/US2013/041610, Feb. 2, 2015.

* cited by examiner

*Primary Examiner* — John J Figueroa
(74) *Attorney, Agent, or Firm* — Elwood L. Haynes

(57) ABSTRACT

The present invention is a cryogenic subterranean fracturing fluid, comprising a liquefied industrial gas and a viscosity increasing additive. The liquefied industrial gas may be liquefied carbon dioxide, liquefied nitrogen, or a blend of the two. The liquefied industrial gas mixture should be substantially free of water. In this context, substantially free of water means less than 10% water by volume, or preferably less than 5% water by volume. In addition to the viscosity increasing additive, a proppant may be added to the fracturing fluid. In addition to the viscosity increasing additive and/or proppant additional additives may be added to the liquefied industrial gas as required.

12 Claims, No Drawings

HYDRAULIC FRACTURING WITH IMPROVED VISCOSITY LIQUEFIED INDUSTRIAL GAS BASED SOLUTION

TECHNICAL FIELD

This invention relates to a method of fracturing subterranean formations penetrated by a well bore utilizing liquefied industrial gas as the carrier for chemicals instead of water.

BACKGROUND

The treatment of subterranean formations penetrated by a well bore to stimulate the production of hydrocarbons therefrom or the ability of the formation to accept injected fluids has long been known in the art. One of the most common methods of increasing productivity of a hydrocarbon-bearing formation is to subject the formation to a fracturing treatment. This treatment is effected by injecting a liquid, gas or two-phase fluid which generally is referred to as a fracturing fluid down the well bore at sufficient pressure and flow rate to fracture the subterranean formation. A proppant material such as sand, fine gravel, sintered bauxite, glass beads or the like can be introduced into the fractures to keep them open. The propped fracture provides larger flow channels through which an increased quantity of a hydrocarbon can flow, thereby increasing the productive capability of a well.

A traditional hydraulic fracturing technique utilizes a water or oil-based fluid to fracture a hydrocarbon-bearing formation.

SUMMARY

The present invention is a cryogenic subterranean fracturing fluid, comprising a liquefied industrial gas and a viscosity increasing additive. The liquefied industrial gas may be liquefied carbon dioxide, liquefied nitrogen, or a blend of the two. The liquefied industrial gas mixture should be substantially free of water. In this context, substantially free of water means less than 10% water by volume, or preferably less than 5% water by volume. In addition to the viscosity increasing additive, a proppant may be added to the fracturing fluid. In addition to the viscosity increasing additive and/or proppant additional additives may be added to the liquefied industrial gas as required.

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

A hydraulic fracture is formed by pumping the fracturing fluid into the wellbore at a rate sufficient to increase pressure downhole to exceed that of the fracture gradient of the rock. The rock cracks and the fracture fluid continues farther into the rock, extending the crack still farther, and so on. Operators typically try to maintain "fracture width", or slow its decline, following treatment by introducing a proppant into the injected fluid, a material, such as grains of sand, ceramic, or other particulates, that prevent the fractures from closing when the injection is stopped. Consideration of proppant strengths and prevention of proppant failure becomes more important at deeper depths where pressure and stresses on fractures are higher. The propped fracture is permeable enough to allow the flow of formation fluids to the well. Formation fluids include gas, oil, salt water, fresh water and fluids introduced to the formation during completion of the well during fracturing.

The location of one or more fractures along the length of the borehole is strictly controlled by various different methods which create or seal-off holes in the side of the wellbore. Typically, hydraulic fracturing is performed in cased wellbores and the zones to be fractured are accessed by perforating the casing at those locations.

The fluid injected into the rock is typically a slurry of water, proppants, and chemical additives. Additionally, gels, foams, and compressed gases, including nitrogen, carbon dioxide and air can be injected.

Various types of proppant include silica sand, resin-coated sand, and man-made ceramics. These vary depending on the type of permeability or grain strength needed. The most commonly utilized proppant is silica sand. However, proppants of uniform size and shape, such as a ceramic proppant, is believed to be more effective. Due to a higher porosity within the fracture, a greater amount of oil and natural gas is liberated. Sand containing naturally radioactive minerals is sometimes used so that the fracture trace along the wellbore can be measured.

Chemical additives are applied to tailor the injected material to the specific geological situation, protect the well, and improve its operation, though the injected fluid is approximately 98-99.5% liquefied industrial gas, varying slightly based on the type of well. The composition of injected fluid is sometimes changed as the fracturing job proceeds. Often, acid is initially used to scour the perforations and clean up the near-wellbore area. Afterward, high pressure fracture fluid is injected into the wellbore, with the pressure above the fracture gradient of the rock. This fracture fluid contains liquefied industrial gas-soluble gelling agents (such as guar gum) which increase viscosity and efficiently deliver the proppant into the formation. As the fracturing process proceeds, viscosity reducing agents such as oxidizers and enzyme breakers are sometimes then added to the fracturing fluid to deactivate the gelling agents and encourage flowback. The proppant's purpose is primarily to provide a permeable and permanent filler to fill the void created during the fracturing process.

Hydraulic fracturing equipment used in oil and natural gas fields usually consists of a slurry blender, one or more high pressure, high volume fracturing pumps (typically powerful triplex, or quintiplex pumps) and a monitoring unit. Associated equipment includes fracturing tanks, one or more units for storage and handling of proppant, high pressure treating iron, a chemical additive unit (used to accurately monitor chemical addition), low pressure flexible hoses, and many gauges and meters for flow rate, fluid density, and treating pressure. Fracturing equipment operates over a range of pressures and injection rates, and can reach up to 100 megapascals (15,000 psi) and 265 liters per second (9.4 cu ft/s) (100 barrels per minute).[

The present invention is a cryogenic subterranean fracturing fluid, that includes at least a liquefied industrial gas and a first additive. The liquefied industrial gas may be liquefied carbon dioxide, liquefied nitrogen, or a blend of the two. Other liquefied industrial gases may be included in a mixture, but the primary components will be liquefied carbon dioxide or liquefied nitrogen. The liquefied industrial gas mixture should be substantially free of water. In this context, substantially free of water means less than 10% water by volume, or preferably less than 5% water by volume. In addition to the first additive, a proppant may be added to the fracturing fluid. Any proppant known in the art As discussed above, in hydraulic or gas fracturing, a number of additives are routinely added as the particular site requires. In particular, an additive that increases the viscosity of the liquefied industrial gas may be added. Non-limiting examples of such additives include a gelling agent, a cross-linker, or any combination thereof In addition to the first additive, a proppant may be added to the fracturing fluid. Any proppant known in the art may be used. Non-limiting examples of such proppants include quartz sand, aluminum balls, walnut shells, glass beads, plastic balls, ceramic, and resin-clad sand.

The additives may be introduced into the liquefied industrial gas prior to the introduction into said formation, and stored in admixed liquid form. The additives may introduced into the liquid nitrogen in such a way as to form discrete, frozen masses, thereby producing a slurry with the liquid nitrogen. The additives may be introduced into the liquid carbon dioxide in such a way as to form miscible liquid with the liquid carbon dioxide.

Any viscosity increasing cross-linker or gelling agent known to one skilled in the art may added, as needed, to the liquefied industrial gas. Non-limiting examples include Polymeric CO2 Thickeners such as poly(methyl oxirane); polydimethylsiloxane (PDMS); poly(1-,1-,dihydroperfluorooctyl acrylate) (PFOA); fluoroacrylate monomer (1-,1-,2-,2-tetrahydro heptadecafluorodecylacrylate) and styrene (fluoroacrylate-styrene copolymeric) (polyFAST); fluorinated polyurethane disulfate; polyvinyl acetate (PVAc); poly [(1-O-(vinyloxy)ethyl1-2,3,4,6-tetra-O-acetyl-β-D-glucopyranoside)] (PAcGlcVE); 3-acetoxy oxetane; polyvinyl ethylether (PVEE); polyvinyl methoxy methylether (PVMME); polymethyl acrylate (PMA); oligomers of cellulose triacetate (OCTA); and per-acetylated cyclodextrin ring (PACD); benzoyl-vinyl acetate polymer (polyBOVA). Other non-limiting examples of the viscosity increasing cross-linker or gelling agent include Semi-fluorinated troalkyltin fluoride and 12-hydroxystearic acid (HSA).

See National Energy Technology Laboratory; *Mobility and Conformance Control for Carbon Dioxide Enhanced Oil Recovery (CO2-EOR) via Thickeners, Foams, and Gels—A Detailed Literature Review of* 40 *Years of Research*; DOE/NETL-2012/1540, Robert M. Enick and David K. Olsen.

This invention also includes a method of fracturing a subterranean formation penetrated by a well bore comprising: introducing cryogenic subterranean fracturing fluid, comprising a liquefied industrial gas, viscosity increasing agent and a proppant.

What is claimed is:

1. A cryogenic subterranean fracturing fluid, comprising a liquefied industrial gas and a viscosity increasing additive, wherein said liquefied industrial gas comprises between 98% and 99.56% of the cryogenic subterranean fracturing fluid.

2. The cryogenic subterranean fracturing fluid of claim 1, wherein said liquefied industrial gas, and said viscosity increasing additive are substantially free of water.

3. The cryogenic subterranean fracturing fluid of claim 1, further comprising a proppant.

4. The cryogenic subterranean fracturing fluid of claim 3, further comprising at least a second additive.

5. The cryogenic subterranean fracturing fluid of claim 4, wherein said liquefied industrial gas, said viscosity increasing additive, and/or said second additive are substantially free of water.

6. The cryogenic subterranean fracturing fluid of claim 1, wherein said viscosity increasing additive is introduced into said liquefied industrial gas prior to said introduction into said formation, and stored in admixed liquid form.

7. The cryogenic subterranean fracturing fluid of claim 1, wherein said liquefied industrial gas is liquid carbon dioxide.

8. The cryogenic subterranean fracturing fluid of claim 1, wherein said liquefied industrial gas is liquid nitrogen.

9. The cryogenic subterranean fracturing fluid of claim 1, wherein said liquefied industrial gas is a combination of liquid carbon dioxide and liquid nitrogen.

10. The cryogenic subterranean fracturing fluid of claim 7, wherein said second additive is introduced into said liquid carbon dioxide In such a way as to form miscible liquid with liquid carbon dioxide.

11. The cryogenic subterranean fracturing fluid of claim 8, wherein said second additive is introduced into said liquid nitrogen in such a way as to form discrete, frozen masses, thereby producing a slurry with the liquid nitrogen.

12. The cryogenic subterranean fracturing fluid of claim 1, where said viscosity increasing additive is selected from the group consisting of as poly(methyl oxirane); polydimethylsiloxane (PDMS); poly(1-,1-,dihydroperfluorooctyl acrylate) (PFOA); fluoroacrylate monomer (1-,1-,2-,2-tetrahydro heptadecafluorodecylacrylate) and styrene (fluoroacrylate-styrene copolymeric) (polyFAST); fluorinated polyurethane disulfate; polyvinyl acetate (PVAc); poly [(1-O-(vinyloxy)ethyl1-2,3,4,6-tetra-O-acetyl-β-D-glucopyranoside)] (PAcGlcVE); 3-acetoxy oxetane; polyvinyl ethylether (PVEE); polyvinyl methoxy methylether (PVMME); polymethyl acrylate (PMA); oligomers of cellulose triacetate (OCTA); per-acetylated cyclodextrin ring (PACD); benzoyl-vinyl acetate polymer (polyBOVA); semi-fluorinated troalkyltin fluoride, and 12-hydroxystearic acid (HSA).

* * * * *